Nov. 4, 1952  H. H. BURTON ET AL  2,616,129
MANUFACTURE OF CORRUGATED OR CONVOLUTE
HOSE AND TO MEANS THEREFOR
Filed March 1, 1949  3 Sheets-Sheet 1

Inventors
HUBERT HENRY BURTON AND
LESLIE THOMAS GOODMAN
By Linton and Linton
Attorneys Nov. 4, 1952  H. H. BURTON ET AL  2,616,129
MANUFACTURE OF CORRUGATED OR CONVOLUTE
HOSE AND TO MEANS THEREFOR
Filed March 1, 1949  3 Sheets-Sheet 2
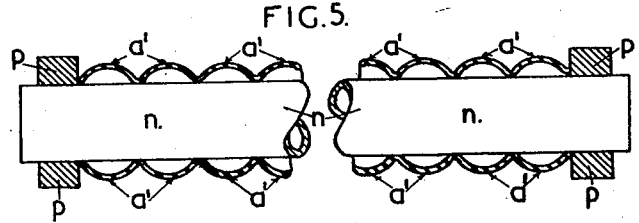
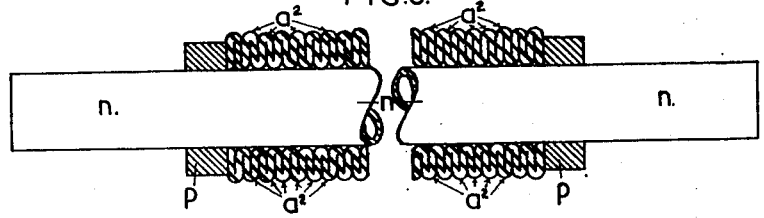
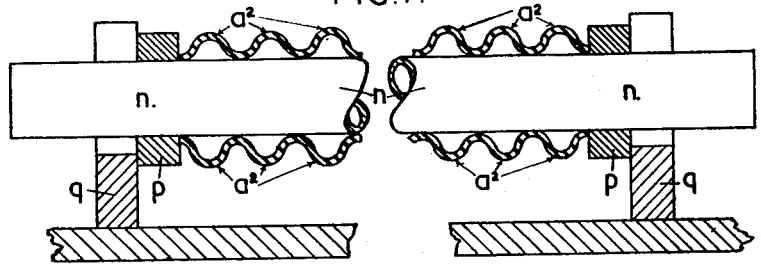
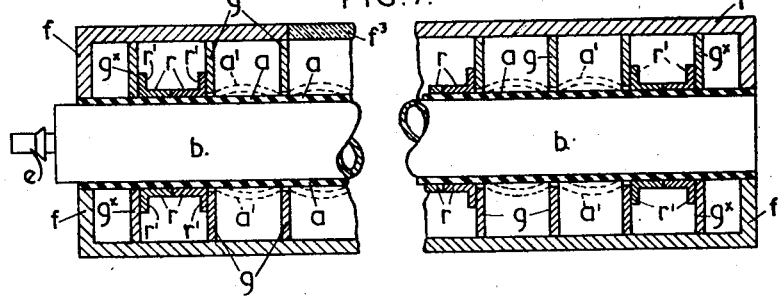
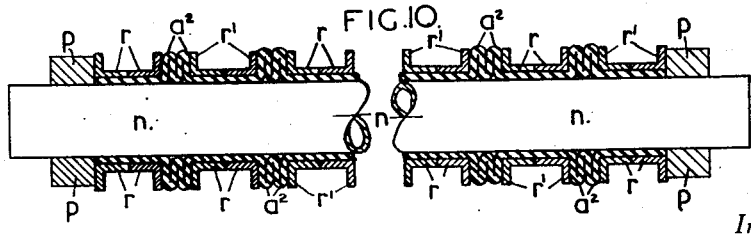
Inventors
HUBERT HENRY BURTON AND
LESLIE THOMAS GOODMAN
By Linton and Linton
Attorneys Nov. 4, 1952

H. H. BURTON ET AL 2,616,129

MANUFACTURE OF CORRUGATED OR CONVOLUTE
HOSE AND TO MEANS THEREFOR

Filed March 1, 1949

Inventors
HUBERT HENRY BURTON AND
LESLIE THOMAS GOODMAN
By Linton and Linton
Attorneys

UNITED STATES PATENT OFFICE 2,616,129

MANUFACTURE OF CORRUGATED OR CONVOLUTE HOSE AND TO MEANS THEREFOR

Hubert Henry Burton and Leslie Thomas Goodman, Leicester, England, assignors to John Bull Rubber Company Limited, Leicester, England, a company of Great Britain Application March 1, 1949, Serial No. 79,066
In Great Britain March 1, 1948

15 Claims. (Cl. 18—19)

This invention relates to the manufacture of corrugated, or so-called "convoluted," hose in which the wall of the hose is provided with hollow external corrugations at desired spacings along it, particularly of the kind suitable for associating the radiator of a motor with its flexibly mounted engine, but which, of course, is applicable to a variety of other uses; and our invention aims, inter alia, to simplify and so cheapen the cost of manufacture of such hose.

The invention comprises a method of manufacture of corrugated rubber hose which includes a pre-forming step wherein an unvulcanized rubber tube is subjected to differential air pressure between the interior and exterior while the wall of the tube is restrained at certain desired places, but is otherwise free to expand, the differential pressure being such that hollow, circumferential swellings or undulations are formed around the unrestricted portions of the tube.

The invention also comprises a method of manufacture including the pre-forming step above indicated and also including a step wherein the tube is collapsed and shortened by end pressure while it is internally supported so as to expand radially and contract axially the circumferential swellings or undulations caused by said pre-forming step.

The corrugations formed on the tube may be uniformly pitched along its entire length, or they may be so spaced as to leave required portions of the tube plain and uncorrugated. After said corrugations have been formed, and while restrained from axial expansion, the tube is vulcanized in conventional manner.

According to our invention, a length of plain tubing of rubber, or vulcanizable rubber composition, is, in an unvulcanized state, mounted upon a perforate, hollow mandrel and thereafter introduced into a longitudinally split box or die (hereinafter referred to as "inflating box" or "box") of larger internal diameter than that of the exterior diameter of the tubing. Each half or section of said inflating box is provided internally with transversely disposed vanes or fins spaced apart at pre-selected distances along its length; and said fins, when the box is closed, co-operate to reduce the interior diameter of the box at those points where the fins are located to approximately the exterior diameter and configuration of the unvulcanized tubing placed therein. The two end pairs of co-operating fins are of a size which effectively seal said rubber tube adjacent its ends against the perforate mandrel upon which it is mounted.

In one procedure, an elastic fluid, such as air, under pressure is introduced into said mandrel and said pressure fluid, by reason of said perforations of the mandrel, expands the unrestricted portions of the rubber tubing outward into the cavities between said fins, thus preforming the required corrugations. During this operation the two halves of the inflating box are maintained in completely closed relationship by external pressure or/and catch members secured to the inflating box itself. In an alternative procedure in lieu of introducing pressure air into the mandrel, projection of the tubing into the spaces between the fins may be effected by exhausting the air from the box.

The pre-formed tubing is removed from the box and, supported by a mandrel, is collapsed—concertina fashion—so causing the swellings of the wall to fold into corrugations of larger circumference but smaller axial dimensions and bringing the series of corrugations along the tube into close relation or pitch.

For the purpose of imparting regularity of form to each corrugation, it is preferred that the tubing be maintained in its closely corrugated state for an interval of time sufficient to effect the end in view.

In order to extend the tube to required length, and/or to space apart the corrugations thereof to required pitch, a jet of pressure air may be applied to one end in order to relieve its adhesion and to cause or permit it to be extended along the mandrel as required.

The tubing, longitudinally restrained upon its mandrel, is vulcanized, and after vulcanization, removed from the mandrel with the aid of an air jet.

If it is desired to produce tubing having a plain length or lengths adjoining a corrugated portion or portions, certain of the spaces between the fins of the inflating box may be filled up; or, alternatively, restricting collars of metal, or other suitable material, may be fitted over the tubing at those parts where it is required to remain in a plain non-corrugated state.

We will further describe our invention with the aid of the accompanying explanatory drawings which illustrate, by way of example only, and not of limitation, means or apparatus for carrying same into effect.

In said drawing—

Fig. 5 is a longitudinal view, partly in section, of a pre-formed length of tubing mounted on a plain mandrel, Fig. 6 is a similar view of the tubing when collapsed by end pressure, and Figs. 7 and 8 are side and end views, respectively, of the tubing extended between stops to required length and pitch.

Fig. 9 is a longitudinal section showing a length of tubing fitted with restricting collars and disposed within an inflating box.

Fig. 10 is a longitudinal section showing the tubing of Fig. 9 as collapsed by end pressure after pre-forming.

Figure 1:
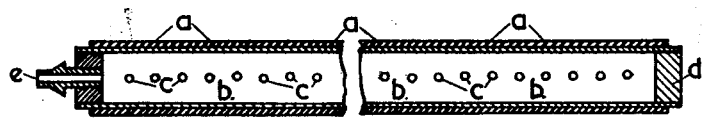
Fig. 1 is a longitudinal view in section of a length of unvulcanized rubber tubing mounted on a perforate mandrel.
Figure 2:
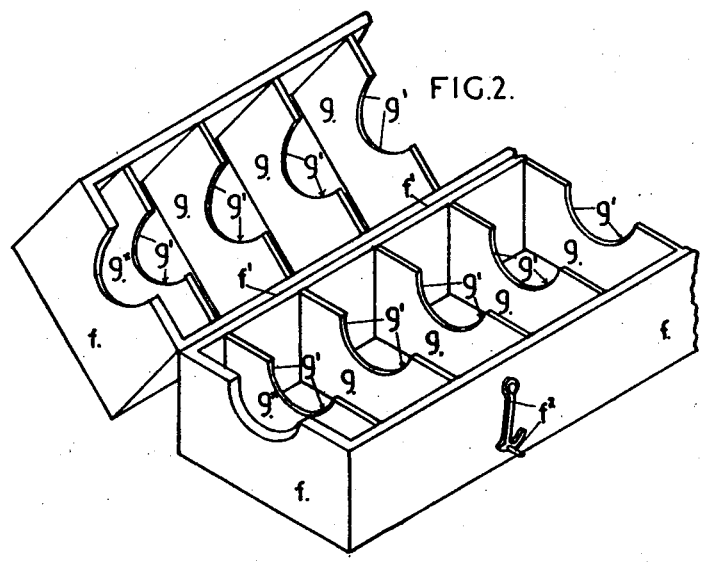
Fig. 2 is a perspective view showing portion of an inflating box.

Referring now to said drawings, in which like characters of reference denote like or equivalent parts wherever they occur, and firstly to Fig. 1, $a$ denotes a length of plain unvulcanized rubber tubing which is mounted upon a hollow mandrel $b$ provided with perforations $c$. One end $d$ of said mandrel $b$ is sealed and the other end provided with the male half $e$ of a pipe-line union. Tubing $a$ and mandrel $b$ are introduced into a longitudinally split inflating box $f$ (Fig. 2) hinged at $f^1$ and of internal diameter larger than that of the exterior of tubing $a$. Each half or section of box $f$ is provided internally with a plurality of transversely disposed fins $g$ spaced apart along its length, and said fins $g$ having semi-circular edges $g^1$ which, when the box is closed, co-operate to reduce the interior diameter of the box at those points where fins $g$ are located to approximately the exterior diameter and configuration of tubing $a$.

The two end pairs of fins designated $g^x$ have semi-circular co-operating edges $g^1$ of reduced radius in order to seal tube $a$ adjacent its ends against mandrel $b$ when box $f$ is closed. The radiused edges $g^1$ of the intermediate fins $g$ are such as to provide a clearance fit around tube $a$.

Box $f$ is placed beneath air cylinders $h$ with plungers $j$ which latter, when pressure air is admitted to said cylinders via a pipe-line $k$ with valve $k^1$, bear down upon said box $f$ to maintain it in a completely closed state and to ensure sealing of the ends of tube $a$ against mandrel $b$ by end fins $g^x$. Catches $f^2$ may be fitted to box $f$.

Figure 3:
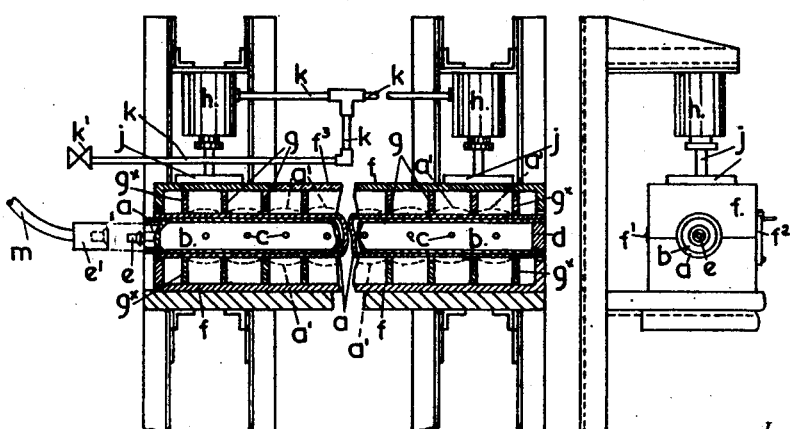
Figs. 3 and 4 are, respectively, a part sectional side view, and an end view, drawn to a reduced scale as compared with the preceding views, of the inflating box in operative position beneath apparatus whereby it is maintained fully closed.

Pressure air is then admitted to the interior of mandrel $b$ via a flexible pipe-line $m$ fitted with a union component $e^1$ adapted to fit over union component $e$ of mandrel $b$, and said pressure air, by reason of said perforations $c$ expand those portions of tube $a$ which are not restrained by the encircling edges $g^1$, of fins $g$ into the spaces between said fins as indicated by broken lines in Fig. 3, to form circumferential swellings $a^1$.

In order that an operator may observe the extent to which tubing $a$ is pre-formed by the pressure air, box $f$ is preferably provided with an observation panel $f^3$.

When the pre-forming step is complete, tubing $a$ is removed from mandrel $b$ and placed upon a plain mandrel $n$ (Fig. 5), and a hard rubber or other collar $p$ is slid over each end of mandrel $n$ to protect the end of tubing $a$.

By means of manually or mechanically applied end pressure on collars $p, p$, tube $a$ is collapsed—concertina fashion—and shortened (Fig. 6), thus causing said circumferential swellings $a^1$ thereof to fold into corrugations $a^2$ of larger circumference but of smaller dimensions, so bringing the series of corrugations into close relationship or pitch.

In order to extend tubing $a$ to required length, and to space apart corrugations $a^2$ thereof to required pitch, the ends of mandrel $n$ are supported upon adjustable stops or gauges $q$ which are spaced apart as required, and collars $p, p$ are moved outward into abutment with said stops $q$. A jet of pressure air, preferably from a nozzle the orifice whereof is in the form of a narrow slit, is then applied to an end of tubing $a$ to relieve its adhesion to mandrel $n$, and cause or permit it to be extended along mandrel $n$ until its overall length is equal to the distance between the inner faces of collars $p, p$.

Tubing $a$, restrained from axial expansion by collars $p, p$, is then vulcanized, e. g. by placing it in a suitable rack provided with brackets which prevent longitudinal displacement of said collars $p, p$, and after vulcanization, collars $p, p$, are removed and the, now, permanently corrugated tube is removed from mandrel $n$ by the aid of an air jet.

If it is desired to produce tubing having a plain length or lengths adjoining a corrugated portion or portions, certain of the spaces between fins $g$ of inflating box $f$ may be filled up flush with the restricting surfaces $g^1$ of said fins, but a preferred method of achieving this object comprises fitting restricting collars $r$ with flanges $r^1$ (Fig. 9) over tubing $a$ at those parts where it is required to remain in plain non-corrugated state. Said collars $r$ are fitted in pairs prior to the introduction of tubing $a$ within inflating box $f$, the length of each collar $r$ being substantially equal to half the required length of a non-corrugated tube portion.

The pre-forming step is carried out as before, and the unrestricted portions of tube $a$ are caused to expand and form circumferential swellings or undulations $a^1$ as indicated by broken line in Fig. 9.

In Fig. 10 tubing $a$, with said restricting collars $r$ still in position, is shown collapsed, as before, on a plain mandrel $n$ between collars $p, p$, and it is to be noted that during this step in addition to preserving the configuration of plain portions $a^3$ of tube $a$, the flanges $r^1$ of collars $r$ support the corrugations $a^2$ immediately adjacent said plain portions $a^3$ and prevent deformation of same.

Figure 4:
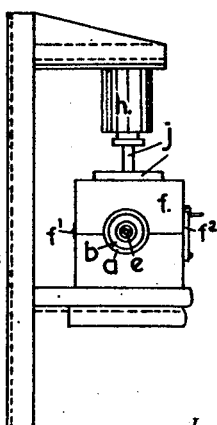
Figure 8:
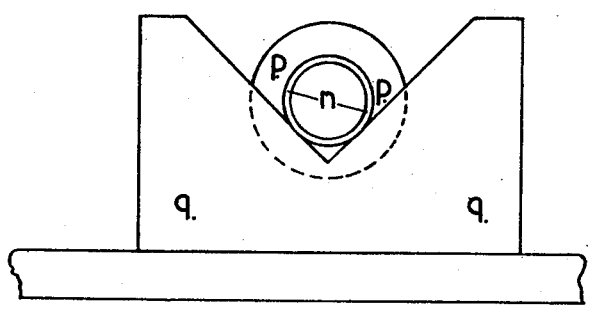
Figure 11:
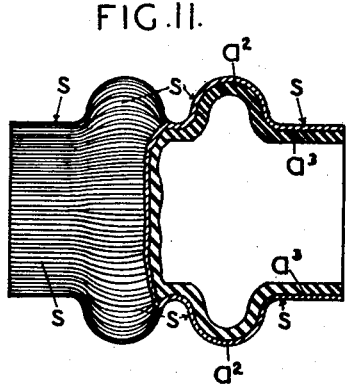
Fig. 11 is a view, partly in section of a length of corrugated tubing with plain ends and provided with a seamless stockinette cover.

After vulcanizing, tubing $a$ is severed or parted between said pairs of collars $r$, which may then be removed, and lengths of corrugated tubing provided with plain portions $a^3$ at each end (Fig. 4) are obtained.

As an alternative, single split collars may be employed in place of the referred to pairs of collars, which may be removed from the tubing prior to the severing of same.

The initial position or spacing of collars $r$ on tubing $a$ may be facilitated by appropriately marking box $f$.

If desired, a seamless tubular covering of stockinette $s$ or other extensible material, may be applied to tubing $a$ before the pre-forming and corrugating steps are carried out. This may include the application of a solvent to the stockinette, or other material, or to the rubber, or to both, before drawing the covering material on to the tubing.

It is to be noted in the carrying out of our invention, an important advantage resides in the regularity of stresses in the tubing, as opposed to irregularities common to tubing of similar nature, produced by conventional methods of moulding.

By suitably arranging the fins in each section of the inflating box the corrugations of the tube may be formed helically thereon instead of in a plane perpendicular to the axis of said tube.

What we claim as our invention and desire to secure by Letters Patent is:

1. A method of manufacturing corrugated flexible hose comprising in combination the steps of restraining spaced annular portions of the exterior of an unvulcanized rubber tube and leaving intervening portions unsupported externally, supporting the rubber tube internally against inward displacement continuously along substantially the whole of its length, sealing the restrained and internally supported tube in a fluid chamber the fluid content of which surrounds the tube and is prevented from expulsion from the chamber subjecting the tube while so restrained to differential fluid pressure between its interior and exterior, the pressure on the exterior of the tube being that of the fluid trapped in the fluid chamber and said differential pressure being such that the intervening, externally unsupported portions of the tube are caused to swell circumferentially, removing the tube and its internal support and expanding the external swellings radially and contracting them axially to form the desired corrugations.

2. A method of manufacturing corrugated flexible hose comprising in combination the steps of restraining portions of the exterior of an unvulcanized rubber tube which portions are of small axial extent and are at spaced intervals, thus leaving intervening portions unrestrained externally for a substantial axial distance, supporting the rubber tube internally against inward displacement continuously along substantially the whole of its length, sealing the restrained and internally supported tube in a fluid chamber the fluid content of which surrounds the tube and is prevented from expulsion from the chamber, supplying fluid under pressure to the interior of the tube so as to cause the externally unsupported portions of the tube to swell circumferentially against the cushioning effect of the fluid trapped in the fluid chamber; removing the internally supported tube and expanding the external circumferential swellings radially and contracting them axially by applying pressure to the ends of the unvulcanized tube while it is supported internally, and subsequently expanding the tube axially by air pressure on its internal support to space the corrugations as desired and vulcanizing the corrugated tube so formed.

3. A method of manufacturing corrugated flexible hose comprising in combination the steps of introducing an unvulcanized rubber tube into a fluid chamber and sealing the chamber to trap therein a cushion of fluid surrounding said tube, inflating said tube while restraining spaced portions thereof from outward expansion and leaving intervening portions unsupported externally thereby causing said unsupported portions to swell circumferentially against the cushion of fluid surrounding said tube into incipient external corrugations, expanding the incipient corrugations radially and contracting them laterally, restraining portions of the tube between series of corrugations and preventing departures of the tube wall from the normal plain, that is uncorrugated, form of the tube at such restrained portions; removing said restraint on said tube and vulcanizing the corrugated tube, and subsequently cutting the tube at the said plain uncorrugated portions.

4. Means for the manufacture of corrugated flexible hose including, in combination a hollow perforated mandrel of rigid construction which is sealed at one end and provided with a pressure fluid connection at the other end, said mandrel having a continuous external cylindrical surface for supporting and preventing inward displacement of substantially the whole of the length of a preformed unvulcanized rubber tube on which corrugations are to be formed, and a fluid chamber formed in two hingedly connected sections, each section being provided internally with relatively thin transversely disposed rigid fins spaced apart at pre-selected distances along the length of the chamber, and which fins, when the chamber is closed, co-operate to reduce the interior diameter of the chamber at those points where the fins are located to approximately the exterior diameter and configuration of the unvulcanized tube supported on said perforated mandrel so as to restrain said tube at those points from expansion while leaving intervening portions between said fins free to expand.

5. Means for the manufacture of corrugated flexible hose as specified in claim 4 wherein the end pairs of said transverse fins are of dimensions which enable the fins effectively to seal the ends of unvulcanized tubing against the mandrel upon which it is mounted and to trap a cushion of air in the box surrounding the tubing, and the intermediate fins are of dimensions which provide a clearance fit around said tubing.

6. An improved manufacture of corrugated flexible hose including, in combination, the steps of internally supporting an unvulcanized rubber tube against inward displacement continuously along substantially the whole of its length, externally and circumferentially supporting said internally supported tube against outward displacement at the ends of the tube and at spaced intervals along its length, subjecting said supported tube to differential fluid pressure between its interior and exterior to expand outwards only those portions of the tube intermediate the externally and circumferentially supported portions and form circumferential swellings at spaced intervals along the length of said tube, removing the swollen tube from a position in which it is externally supported as aforesaid, applying pressure in an axial direction to the ends of the internally supported swollen tube to collapse the tube and shorten its length, and thereby to collapse the tube and fold the circumferential swellings into juxtaposed corrugations, determining the desired pitch of the corrugations and the overall length of the tube by relieving the pressure applied to the ends of the tube, restraining the tube from further axial expansion when the desired pitch of the corrugations and overall length of the tube have been obtained, and vulcanising, the restrained tube.

7. An improved manufacture of corrugated flexible hose as specified in claim 6 in which the internally supported tube is externally and circumferentially supported against outward displacement at its ends and at equidistantly spaced intervals along its length.

8. An improved manufacture of corrugated flexible hose as specified in claim 6 in which the internally supported tube is externally and circumferentially supported against outward displacement at its ends and at equidistantly spaced intervals along portions of its length, the remaining portions of the tube adjacent said first mentioned portions being wholly restrained against outward displacement.

9. An improved manufacture of corrugated flexible hose as specified in claim 6 in which the vulcanised tube is removed from the position in which it is internally supported against inward displacement by inflating the tube.

10. An improved manufacture of corrugated flexible hose including, in combination, the steps of internally supporting an unvulcanized rubber tube against inward displacement continuously along substantially the whole of its length, externally and circumferentially supporting said internally supported tube against outward displacement at the ends of the tube and at spaced intervals along its length, sealing said supported tube in a fluid chamber and positively preventing expulsion from the chamber of fluid surrounding the tube, inflating the tube by a fluid pressure greater than the pressure of the surrounding fluid to expand only those portions of the tube intermediate the externally and circumferentially supported portions and form circumferential swellings at spaced intervals along the length of the tube, removing the swollen tube from the position in which it is externally and circumferentially supported in the fluid chamber, applying pressure in an axial direction to the ends of the internally supported swollen tube to collapse the tube and shorten its length and thereby to collapse the tube and fold the circumferential swellings into juxtaposed corrugations, determining the desired pitch of the corrugations and the overall length of the tube by relieving the pressure applied to the ends of the tube, restraining the tube from further axial expansion when the desired pitch of the corrugations and overall length of the tube have been obtained, and vulcanising the tube so restrained.

11. An improved manufacture of corrugated flexible hose as specified in claim 10 in which the fluid trapped in the fluid chamber is air which is at atmospheric pressure before the tube is inflated, the pressure of said trapped air increasing when the tube is inflated.

12. Improved method of manufacture of corrugated flexible hose including the steps of placing an unvulcanised rubber tube upon a rigid support capable of preventing its displacement inwardly throughout substantially the whole of its surface, inserting the supported tube in a sealed chamber wherein it is subjected to differential fluid pressure between its interior and exterior while spaced portions of its exterior are restrained from outward expansion and intervening portions are unsupported externally and are free to expand against a cushion of fluid in the chamber whereby external circumferential swellings are formed around the unrestrained portions of the tube, and subsequently vulcanizing the swollen tube.

13. Improved method of manufacture of corrugated flexible hose including the steps of placing an unvulcanized rubber tube upon a rigid support capable of preventing its displacement inwardly throughout substantially the whole of its surface, inserting the supported tube in a sealed chamber wherein it is subjected to differential fluid pressure between its interior and exterior while spaced portions of its exterior are restrained from outward expansion and intervening portions are unsupported externally and are free to expand against a cushion of fluid in the chamber whereby external circumferential swellings are formed around the unrestrained portions of the tube and are subsequently expanded radially and contracted axially to form the desired corrugations, and vulcanizing the tube while the corrugations are restrained from axial expansion.

14. Means for the manufacture of corrugated flexible hose as claimed in claim 4, including the provision of end pieces for fitting over each end of a mandrel and one of which is fixed on the mandrel whilst the other can be caused to slide thereon to contract axially and expand the intervening expanded portions of the preformed and unvulcanized tube supported on the mandrel.

15. Means for the manufacture of corrugated flexible hose as claimed in claim 4, including the provision of flanged restricting collars for fitting web to web in pairs on the unvulcanized tube on the mandrel and whereby is formed corrugated tubing having plain uncorrugated portions at intervals.

HUBERT HENRY BURTON.
LESLIE THOMAS GOODMAN.

REFERENCES CITED

The following references are of record in the file of this patent:

UNITED STATES PATENTS

| Number | Name | Date |
|---|---|---|
| 335,935 | Kipper | Feb. 9, 1886 |
| 2,007,548 | Sampson | July 9, 1935 |
| 2,073,335 | Connell | Mar. 9, 1937 |
| 2,248,898 | Ross | July 8, 1941 |
| 2,299,520 | Yant | Oct. 20, 1942 |
| 2,384,056 | Tritt | Sept. 4, 1945 |
| 2,410,936 | Gronemeyer | Nov. 12, 1946 |
| 2,446,281 | Harding | Aug. 3, 1948 |